United States Patent Office

3,232,737
Patented Feb. 1, 1966

3,232,737
METHOD OF CONTROLLING PLANT GROWTH
Joe R. Willard and Kenneth P. Dorschner, Middleport, N.Y., assignors to FMC Corporation, New York, N.Y., a corporation of Delaware
No Drawing. Filed Nov. 15, 1962, Ser. No. 238,036
3 Claims. (Cl. 71—2.6)

This invention relates to new herbicidal compositions, and particularly to a new method for the control of undesirable plant growth, both pre-emergently and post-emergently, by application of new and useful herbicidal compositions.

Specifically, this invention relates to herbicidal compositions containing dimethallyl esters of halo-substituted phthalic acids as essential active ingredients, and particularly to herbicidal compositions containing dimethallyl 3-chlorophthlate as an essential active ingredient. The herbicidal activity of this ester is of a completely different order than that of even such related compounds as diallyl phthalate, which has itself shown a slight degree of herbicidal activity.

Dimethallyl 3-chlorophthalate is not only an unusually effective herbicide, but it appears to operate by the rare mechanism of chlorophyll inhibition. It also exhibits an unusual order to selectivity, and thus is of enhanced utility in the control of specific undesired plants, in both pre-emergent and post-emergent application.

The mechanism of selective herbicidal activity is not yet understood, although it has been the subject of extensive investigation and speculation. To predict the herbicidal activities of even closely related compounds is at present not possible. Thus far, only extensive testing and evaluation have permitted the discovery of specific compounds which have the selectivity desired for specific uses; that is, the selectivity needed to control certain undesired plant species in the presence of specific desired plant species. It is therefore of interest to observe both the high degree of activity and the extreme selectivity of the activity of herbicidal compositions containing dimethallyl 3-chlorophthalate as the essential ingredient. This is the subject of the instant invention.

Dimethallyl 3-chlorophthalate may be prepared by known procedures for the synthesis of allyl esters of phthalic acids. The compound may be prepared by a conventional acid catalyzed esterification reaction, of 3-chlorophthalic acid or anhydride with methallyl alcohol or methallyl halide. It may also be prepared by reacting the metallic salt of 3-chlorophthalic acid with a methallyl halide, either amine-catalyzed in non-aqueous medium, or in aqueous medium by a process such as is described by A. De Benedictus in U.S. Patent 2,939,879, issued June 7, 1960. Many other processes for the preparation of allylic esters of carboxylic acids are known and have been described in the chemical literature. A typical preparative method is illustrated below:

EXAMPLE 1

Twenty-seven and four tenths grams of 3-chlorophthalic anhydride was added to a stirred solution of 12.0 grams sodium hydroxide dissolved in 28 grams of water at 95° C., over a 20 minute period. The solution was stirred for an additional 45 minutes at 95° C., 5 grams of water was added, and the solution was evaporated in vacuo, to yield 45.7 grams of dried disodium 3-chlorophthalate. To the salt were added 45.5 grams of methallyl chloride and 4 ml. of triethylamine, and the mixture was refluxed for 30 hours with stirring, over a temperature range of 72° to 86° C. The reaction mixture was extracted with benzene, the benzene extracts were washed with dilute hydrochloric acid and with water, then dried and distilled under reduced pressure, to yield 40.6 grams (97.8% yield) of dimethallyl 3-chlorophthalate, B.P. 156–157° C./0.8 mm., refractive index $n_D^{24.8}$ 1.5221.

By a similar procedure, the dimethallyl ester of a mixture of 3- and 4-chlorophthalic acids was prepared, as shown in the following example:

EXAMPLE 2

From a crude mixture of chlorophthalic anhydrides, containing over 60% 3-chlorophthalic anhydride, the remainder containing unchlorinated, 4-chloro- and polychlorophthalic anhydrides, was prepared the disodium salt as in Example 1. To 23.5 grams of this crude salt was added 20.9 grams of methallyl chloride and 2.7 grams of triethylamine, and the mixture was stirred and heated to reflux. Twenty-five cc. of toluene was added, and the mixture was refluxed for a total of 48 hours, over a temperature range of 82–105° C. Water was added to the reaction mixture, the organic layer was separated and the aqueous layer was extracted with benzene. The organic layers were combined, the solvents were removed under reduced pressure, and the residue was distilled, to yield 17 grams (55%) of crude dimethallyl chlorophthalates, B.P. 160–163° C./1.1 mm. This crude mixed product, which contained over 60% dimethallyl 3-chlorophthalate, is itself a useful selective herbicide, as will be demonstrated below.

For herbicidal applications, the dimethallyl 3-chlorophthalate of this invention may be utilized in diverse formulations, including the adjuvants and carriers normally employed for facilitating the dispersion of active ingredients for agricultural applications, but recognizing the fact that the formulation and mode of application of a toxicant may affect the activity of the material in a given application. Thus, the dimethallyl 3-chlorophthalate may be formulated as a granule of relatively large particle size, as a powdery dust, as a wettable powder, as an emulsifiable concentrate, as a solution, or as one of the less common types of formulations, depending on the desired mode of application. For pre-emergent application, these herbicidal compositions are usually applied either as sprays, dusts or granules in the area in which suppression of vegetation is desired. For post-emergent control of the established plant growth, sprays or dusts are most commonly used. These formulations may contain as little as 0.5% or as much as 95% or more by weight of active ingredient.

Dusts are admixtures of the active ingredient with finely divided solids such as talc, attapulgite clay, kieselguhr, and other organic and inorganic solids which act as dispersants and carriers for the toxicant; these finely divided solids have an average particle size of less than about 50 microns. Since the instant toxicant is an oily liquid, an absorbent dust can accommodate high concentrations of active ingredient, if desired. A typical dust formulation, useful herein, is one containing 10.0 parts of dimethallyl 3-chlorophthalate, 30.0 parts of bentonite clay and 60.0 parts talc.

Wettable powders, also useful formulations for both pre- and post-emergent herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5–50% of active ingredient, depending on the absorbency of the carrier, and usually also contain a small amount of a wetting, dispersing or emulsifying agent to facilitate dispersion. For example, a useful wettable powder formulation contains 25.0 parts of the crude dimethallyl 3-chlorophthalates of Example 2, 72.0 parts of bentonite clay and 1.5 parts each of sodium lignosulfonate and sodium laurylsulfonate as wetting agents.

Other useful formulations for herbicidal applications are the emulsifiable concentrates, which are homogeneous liquid or paste compositions which are readily dispersed in water or other dispersant, and may consist entirely of dimethallyl 3-chlorophthalate with a liquid or solid emulsifying agent, or may also contain a liquid carrier, such as xylene, heavy aromatic naphthas, isophorone and other non-volatile organic solvents. For herbicidal application these concentrates are disposed in water or other liquid carrier, and normally applied as a spray to the area to be treated. The percentage by weight of the essential active ingredient may vary according to the manner in which the composition is to be applied, but in general comprises 0.5 to 95 percent of active ingredient by weight of the herbicidal composition.

Typical wetting, dispersing and emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1 percent to 15 percent by weight of the herbicidal composition.

Other uesful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

The formulation and application of the herbicide of this invention is illustrated further in the following examples, wherein all parts and percentages are by weight:

EXAMPLE 3

The pre-emergent herbicidal activity of dimethallyl 3-chlorophthalate was demonstrated as follows: In flat pans was placed, to a depth of three inches, sterile sandy loam soil. In the soil were then planted seeds of Lima beans, corn, cotton and oats, at a depth of one and one half inches; and seels of flax, carrots, lettuce, mustard and ryegrass at a depth of one half inch. As soon as the seeds were planted and the flats watered, the soil was sprayed with a solution in aqueous acetone of dimethallyl 3-chlorophthalate (prepared in Example 1), in a volume of acetone-water equivalent to 40 gallons per acre, and at a rate equal to 6 pounds of toxicant per acre. Both the treated flats and the untreated control were held in the greenhouse for three weeks, after which time the performance of the toxicant was assessed in terms of percent kill with respect to the control.

The results, presented in Table 1 below, show that dimethallyl 3-chlorophthalate shows excellent pre-emergent activity and selectivity, even under extreme conditions of both very low and very high dosages of toxicant:

Table 1.—Pre-emergent herbicidal activity of dimethallyl 3-chlorophthalate

| Plant | Percent Kill | |
|---|---|---|
| | 2 lb./acre | 8 lb./acre |
| Lima beans | 0 | 0 |
| Corn | 0 | 0 |
| Cotton | 0 | 0 |
| Flax | 0 | 75 |
| Oats | 0 | 0 |
| Carrots | 0 | 0 |
| Lettuce | 100 | 100 |
| Mustard | 100 | 100 |
| Ryegrass | 0 | 60 |

It is particularly interesting to observe the marked and efficient pre-emergent selectivity exhibited at doses as low as two pounds per acre, as well as the continuance of this selectivity even at four times this dosage.

The utility and economic significance of this selectivity is apparent further in the data presented in the following table, where the effects of dimethallyl 3-chlorophthalate on various weddy grasses, in the presence of wheat, is shown:

Table 2.—Pre-emergent herbicidal activity of dimethallyl 3-chlorophthalate

| Plant | Percent Kill | |
|---|---|---|
| | 4 lb./acre | 8 lb./acre |
| Wheat | 0 | 0 |
| Crabgrass | 100 | 100 |
| Pigweed | 100 | 100 |
| Lambsquarter | 100 | 100 |
| German hay millet | 90 | 100 |
| Mustard | 100 | 100 |
| Dock | 100 | 100 |

The phytotoxic activity is accompanied by chlorophyll inhibition.

EXAMPLE 4

Post-emergent herbicidal activity of dimethallyl chlorophthalates was demonstrated as follows: Flats were prepared and planted as in Example 3. The flats were watered, and the seeds allowed to grow in the greenhouse for about three weeks, or the time required for the first trifoliate leaf to appear on the Lima beans. Maintaining an untreated control, the stand of plants was then sprayed with the toxicant solution in the manner described in Example 3, employing both the dimethallyl 3-chlorophthalate prepared in Example 1, and the crude dimethallyl 3-chlorophthalate provided in Example 2. The number of surviving plants were counted, and the percent kill with respect to the untreated control was determined. Results are presented in Table 3 below:

Table 3.—Post-emergent herbicidal activity

| Plant | Percent Kill at 6 lb./Acre | |
|---|---|---|
| | Pure Dimethallyl 3-chlorophthalate (Example 1) | Crude Dimethallyl 3-chlorophthalate (Example 2) |
| Lima beans | 100 | 100 |
| Corn | 0 | 0 |
| Cotton | 100 | 0 |
| Flax | 100 | 50 |
| Oats | 0 | 0 |
| Carrots | 0 | 0 |
| Lettuce | 100 | 100 |
| Mustard | 100 | 100 |
| Ryegrass | 25 | 0 |

These data show the marked selectivity exhibited by both samples of dimethallyl 3-chlorophthalate. Both the pure dimethallyl 3-chlorophthalate and the crude product show the common characteristics of complete control of Lima beans, lettuce and mustard in the presence of corn, oats or of carrots.

The herbicidal compositions of this invention may be formulated and/or applied with insecticides, fungicides, nematocides, plant growth regulators, fertilizers, and other agricultural chemicals. In applying the herbicides of this invention, whether formulated alone or with other agricultural chemicals, an effective amount and concentration of the toxicant dimethallyl 3-chlorophthalate is of course employed.

It is apparent that various modifications may be made in the formulation and application of the herbicide of this invention, without departing from the novel concept herein, as defined in the following claims.

We claim:

1. The method of controlling undesired plant growth which comprises applying a herbicidal amount of dimethallyl 3-chlorophthalate to the locus of the undesired plant growth.

2. The method of controlling undesired plant growth prior to emergence of said growth which comprises applying a herbicidal amount of dimethallyl 3-chlorophthalate to the soil wherein this control of undesired plant growth is to be effected.

3. The method of controlling undesired plant growth after emergence of said growth from the soil which comprises applying a herbicidal amount of dimethallyl 3-chlorophthalate to said undesired plant growth.

References Cited by the Examiner
UNITED STATES PATENTS

| | | | |
|---|---|---|---|
| 2,433,616 | 12/1947 | Marple et al. | 260—475 |
| 2,745,729 | 5/1956 | Mowry et al. | 71—2.6 |

LEWIS GOTTS, *Primary Examiner.*